United States Patent [19]
Ansari et al.

[11] Patent Number: 5,881,290
[45] Date of Patent: *Mar. 9, 1999

[54] INDUSTRIAL CONTROLLER DECOMPILER ACCOMMODATING AN EXPANDABLE INSTRUCTION SET

[75] Inventors: Amir S. Ansari, Mayfield Heights; Mohammad S. Khan, Mantura; Jeffrey W. Brooks, Mentor-On-The-Lake, all of Ohio

[73] Assignee: Allen-Bradley Company, LLC, Milwaukee, Wis.

[ * ] Notice: The term of this patent shall not extend beyond the expiration date of Pat. No. 5,819,097.

[21] Appl. No.: 762,658

[22] Filed: Dec. 9, 1996

[51] Int. Cl.$^6$ .................................. G06F 9/44; G06F 9/30
[52] U.S. Cl. .......................... 395/705; 395/710; 395/707; 364/147; 364/140.01
[58] Field of Search ..................................... 395/705–708, 395/710, 702, 500; 364/147, 140.01

[56] References Cited

U.S. PATENT DOCUMENTS

| | | |
|---|---|---|
| 5,005,152 | 4/1991 | Knutsen ................................. 395/705 |
| 5,247,693 | 9/1993 | Bristol ..................................... 395/705 |
| 5,287,548 | 2/1994 | Flood et al. ............................ 364/147 |
| 5,386,569 | 1/1995 | Harada et al. .......................... 395/707 |
| 5,504,902 | 4/1996 | McGrath et al. ....................... 395/707 |
| 5,508,909 | 4/1996 | Maxwell et al. ....................... 364/147 |
| 5,586,328 | 12/1996 | Caron et al. ........................... 395/705 |
| 5,586,330 | 12/1996 | Knudsen et al. ....................... 395/705 |

*Primary Examiner*—James P. Trammell
*Assistant Examiner*—Tuan Q. Dam
*Attorney, Agent, or Firm*—Keith M. Baxter; John M. Miller; John J. Horn

[57] ABSTRACT

A decompiler works with a compiler for an industrial controller having a user modifiable instruction table to contain code fragments necessary to compile particular instructions. During compilation, the instructions are replaced with the code fragments. Thus new instructions recognizable by the compiler may be added simply by editing this instruction table. The decompiler identifies a portion of the compiled new instructions by reference to the same instruction table used by the compiler thus maintaining compatibility with the compiler.

3 Claims, 4 Drawing Sheets

INDUSTRIAL CONTROLLER DECOMPILER ACCOMMODATING AN EXPANDABLE INSTRUCTION SET

CROSS REFERENCE TO RELATED APPLICATION

This application shares disclosure with U.S. application Ser. No. 08/762,232 entitled "Industrial Controller Compiler With Expandable Instruction Set" filed on Dec. 9, 1996.

FIELD OF THE INVENTION

The invention relates generally to decompilers that convert machine readable programs that may be executed on the industrial controllers into human readable source code, and in particular to a decompiler that allows the user to define additional industrial controller instructions that may be compiled with the instructions normally recognized by the decompiler.

BACKGROUND OF THE INVENTION

Industrial controllers are special purpose computers used for controlling industrial processes or manufacturing equipment. Under the direction of a stored program the industrial controller examines a series of inputs reflecting the status of a controlled process or controlled equipment, and changes outputs affecting control of the process or equipment. In the simplest case, the inputs and outputs are binary, that is "On" or "Off". However, analog inputs and outputs taking on a continuous range of values and multi-digital values are also used.

An industrial controller differs from a conventional computer in that it is typically necessary to write a wholly new control program or to significantly edit an existing control program for each new controlled process or machine. For this reason it is important that programming the industrial controller be easy and efficient.

Programming an industrial controller is normally performed by using a programming language having specialized instructions adapted to the control process. One such language represents instructions as contacts and coils of relays, the type of devices that the industrial controller might replace. Additional instructions, such as those implementing timers or counters, are also provided as well as many conventional arithmetic instructions common to general purpose computers.

Often it is desirable to add a new instruction to those that may be used to program the industrial controller. The new instructions simplify the task of writing a control program for a particular device or process. In the original industrial controllers, each instruction was executed directly by controller hardware to obtain the maximum execution speed. Adding a new instruction, in such a case, would require a complete redesign of the controller.

In present industrial controllers, each instruction written by the programmer (source program instructions) is compiled into one or more object program instructions which are directly executed in hardware. With these controllers, adding a new instruction to those recognized by the industrial controller requires only a change to the compiler program and no change to the controller hardware itself.

Even so, compilers are complex programs and rewriting a compiler to add a new instruction that it will recognize and compile is difficult and requires an intimate understanding of the operation of the compiler. A rewriting of the compiler is beyond the reach of most users of industrial controllers.

Often it is desired to provide a decompiler for use with the compiler of an industrial controller so that the compiled control program, as held in the industrial controller, may be converted back into editable source code. Rewriting a compiler to add new instructions, as proposed above, would, in this case, also require the additional effort of rewriting the decompiler, a no less difficult task.

SUMMARY OF THE INVENTION

The present invention provides a compiler and decompiler that permit new instructions to be added to those recognized by modifying an internal instruction table but without otherwise changing the compiler or decompiler program. In decompiling, the internal instruction table is used to identify and replace object code instructions with source code instructions.

Generally, this capability is provided by investing the compiler with a set of rules sufficient only to recognize and compile generic aspects of instructions and operands. The unique aspects of the instructions and operands are contained in object program fragments stored in the internal instruction table. These fragments of code are copied by the compiler into the compiled instructions. The code fragments may then be used by the decompiler, together with a tokenized instruction name, to recognize the compiled instructions.

The compilation process includes at least two steps. The first step moves the necessary operand data for a given instruction to one or more predetermined locations in memory. The second step inserts pre-written object program routines (representing that instruction) into the compiled, object program, these routines receiving the operand data from the predetermined locations and performing the desired controller operation. Additional code routines may be inserted into the object program to return computed value data to the predefined memory locations, or may perform operand-type conversions substantially increasing the power of the compiler. A non-executing token is placed at the top of each compiled instruction to unambiguously identify the generic instruction type although not necessarily the operand types.

The ability to incorporate new instructions into the compiler allows, for example, an equipment manufacturer to write new instructions that reduce the time and skill required for programming the control of that particular piece of equipment. Importantly, the inner operation of the instructions may remain hidden from the ultimate programmer, for example, when modification of the instructions by an inexperienced user should be discouraged or when the process used in an operation is proprietary.

The decompiler, for use with this compiler, uses the instruction table of the compiler, the latter which contains entries associating instruction names with operand interface descriptions (providing information needed to move operand data from an arbitrary memory location to a predetermined memory location of the industrial controller), and instruction executing code executable on the industrial controller to perform the computer operation of the instruction name on operand data at the predetermined memory location. The decompiler provided a token scanner program scanning compiled object code for tokens identifying an instruction name. An unbuilder/delinker portion of the decompiler, then receives the instruction name identified by the token scanner and matches the instruction name with an entry of the instruction table to identify and replace in the object code, the operand gathering code based on the operand interface description, and instruction executing code held in the instruction table, with the instruction name. Finally the remaining object code is reviewed for memory locations and a symbol table is used to replace these memory locations with the corresponding operand names.

Thus, it is an object of the invention to provide a decompiling function for a compiler that may accept user defined instructions. By using the instruction table of the compiler, the decompiler need not be modified in order to be compatible with the new instructions of the compiler.

It is another object of the invention to provide a simple decompiler/compiler functionality that allows great flexibility of operand types. Use of the instruction table to closely identify portions of the object code allows the operands to be better identified.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention however, and reference must be made therefore to the claims for interpreting the scope of the invention.

BRIEF DESCRIPTION OF THE DRAWINGS

FIG. 5 is a diagram similar to that of FIG. 2 showing a decompilation process possible with the compiler of the present invention in which an object program is decompiled back to a source program for editing or the like.

DETAILED DESCRIPTION OF THE PREFERRED EMBODIMENT

Figures 1, 3:
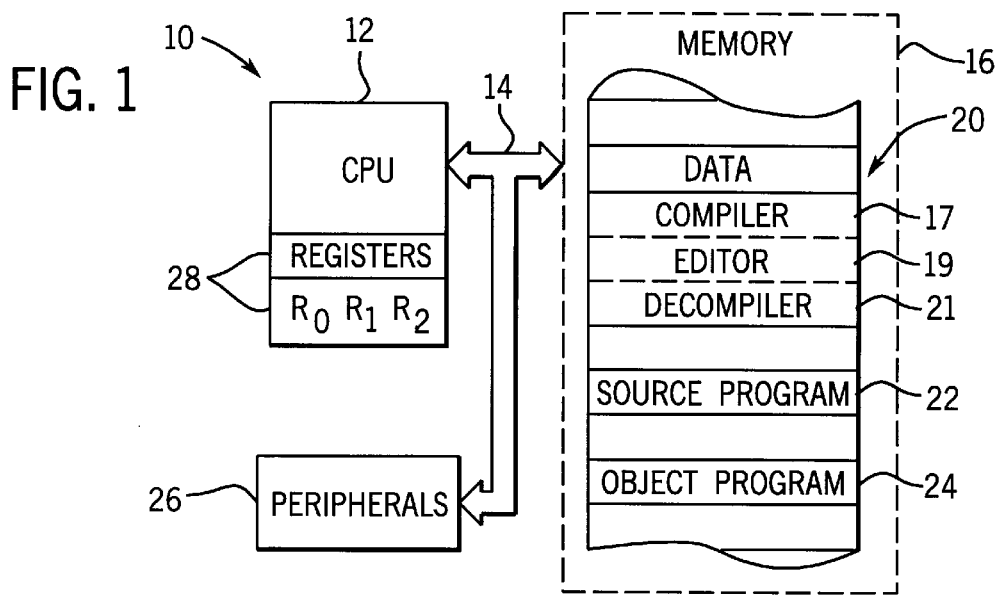
FIG. 1 is a simplified block diagram of a general purpose computer suitable for use with the compiler of the present invention showing computer registers used for operand passing and a source and object program held within computer memory.
FIG. 3 is a weighting table used to select one of several instructions from the instruction table when multiple instructions of that table perform similar computer operations, the weighting table allowing one instruction to be selected according to the best match of operand types.

Referring now to FIG. 1, a computer system 10, on which the compiler program of the present invention may run, includes a central processing unit ("CPU") 12 which may be a microprocessor based single board computer or the like. The CPU 12 communicates via a bus 14 to a computer memory 16 having memory locations addressable by the CPU 12. Memory 16, as used herein, refers both to rapid, solid-state type memory and slower disk storage type memory such as is well known in the art.

Via the bus, the CPU 12 may store data at and receive data from addresses in the memory 16. A number of peripherals 26 are also attached to the bus 14 including a computer terminal having a keyboard and monitor screen to permit the entry of data by the programmer and the readout of information from the computer system 10.

During the operation of the computer system 10, the memory 16 may hold a number of application programs 20 including the compiler 17 of the present invention, a decompiler 21 to be described below, as well as a source program editor 19 and other program writing tools well understood in the art. The memory 16 normally also holds the source program 22 written by a programmer for a particular control process which may be compiled by the compiler 17 to an object program 24.

The object program 24 is also contained in memory 16 but is subsequently downloaded to the industrial controller on which it will run. For purposes of troubleshooting, the object program 24 may be executed on the computer system 10 through specialized peripherals 26 also attached to bus 14.

CPU 12 includes one or more registers 28 ($R_0$, $R_1$, $R_2$) which act as local memory and will henceforth be considered as part of the memory 16.

Operation of the Compiler

Figure 2:
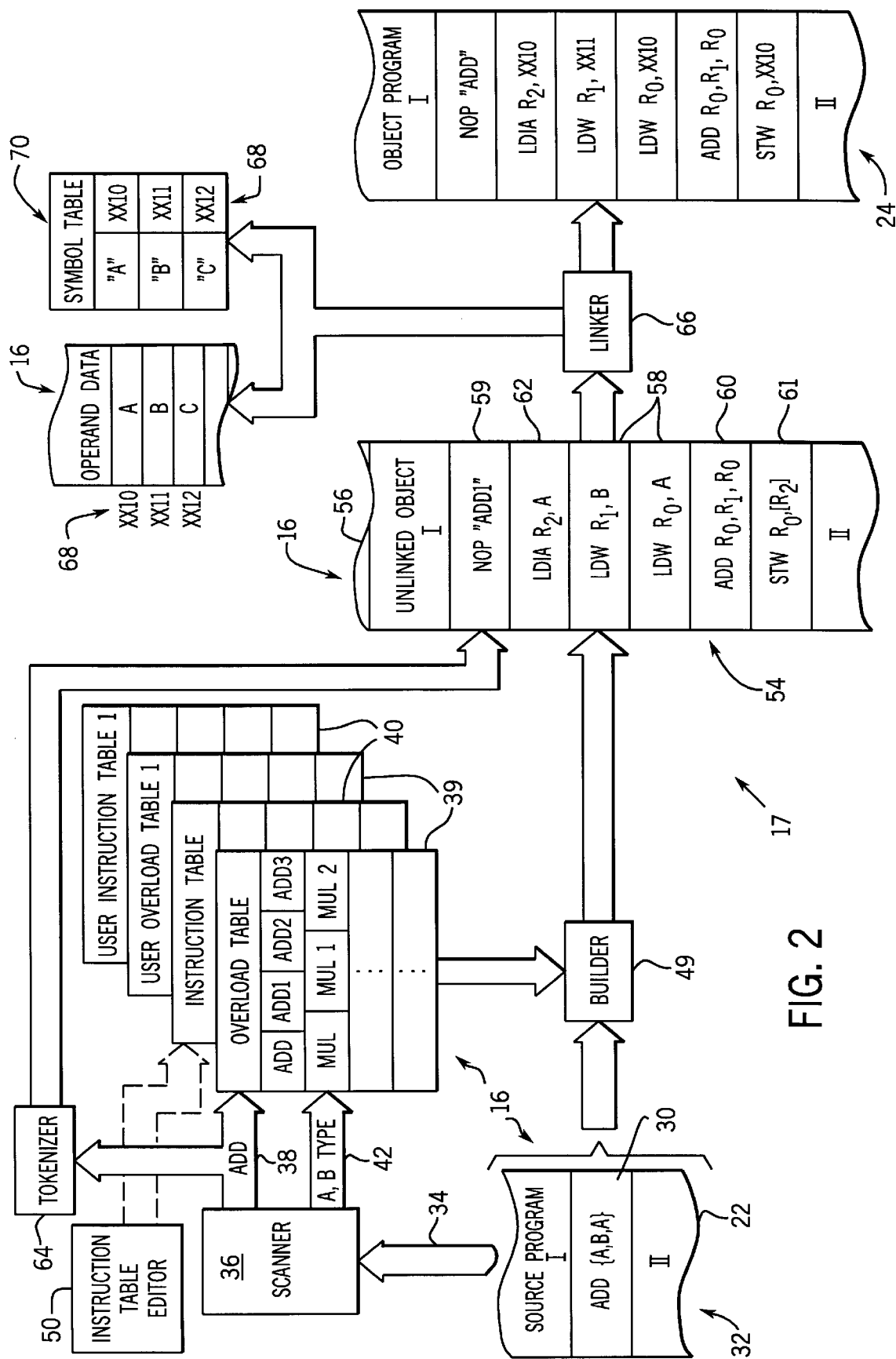
FIG. 2 is a block diagram showing the progression of a source program to object program in the compiling process using a user-editable instruction table allowing the addition of new instructions by the user.

Referring now to FIG. 2, a source program 22 may include a number of statements 30 arranged in sequence within a program body 32. Typical source programs 22 will include many statements 30. Generally each statement 30 includes an instruction name (e.g., "ADD") identifying a particular computer operation to be performed followed by one or more operands (e.g., "A", "B") indicating data on which the operation is to be performed.

In the example statement 30 shown in FIG. 2, "ADD {A, B, A}", an addition is to be performed and the result is to be placed in a variable having name "A". In this example, the statement 30 is relatively simple.

The second and third letters "B" and "A" indicate the operand in the adding operation. The operands are indicated by tag names not referenced to particular memory locations and thus are free to be named in an intuitive mnemonic manner. Normally, each operand will have an operand-type associated with it. This may be done in a definition statement early in the source program 22 (not shown) such as is well known in the art.

The operand type in an industrial controller of the preferred embodiment may be one of five types: a Boolean type, having a value of true or false (i.e. one or zero), or eight-bit, sixteen-bit, or thirty-two-bit integer type and floating point type in which part of the data is stored as an exponent or power of ten. In the integer types, the number prefix indicates the number of bits in computer memory used to represent the value of the operand. The types listed above are in order of number of bits of storage space required. Such operand types and their definition are well known in the art.

The compiler 17 of the present invention first reads the source program 22 as indicated by arrow 34 via scanner routine 36 which scans through each statement 30 of the source program 22, one at a time, to divide each statement 30 into instruction names and operands. The scanner 36 identifies the instruction names and their associated operands by their location within the statement 30. The operand types are identified by earlier definition statements. As indicated by arrows, the instruction names 38 and their operand types 42 are separately sent to one or more overloading tables 39 and instruction tables 40. First, the compiler overloading table 39 and instruction table 40 are examined, continuing with the user-defined overloading tables 39 and user-defined instruction tables 40, if any.

The overloading table 39 matches each instruction in the source program 22 (e.g., ADD) found in a first column of the overloading table 39 to one or more operand specific sub-instructions (e.g., ADD1, ADD2, etc.) found in later columns of that row. The sub-instructions of a row differ from one another according to the type and number of their operands. For example, an ADD1 sub-instruction might add two eight bit integer operands while an ADD2 sub-instruction might add two Boolean operands. The use of the overloading tables 39 will be described below.

The instruction tables 40 provides the essential "personality" of each sub-instruction necessary for the compiling of the source program statements 30 into object program 24. A separate compiler instruction table 40 and one or more user instruction tables 40 are provided, the latter so that the user may add instructions to the compiler without affecting fundamental compiler operation. Only the user instruction table 40 may be edited by the user through the instruction table editor 50 to be described below.

Figure 6:
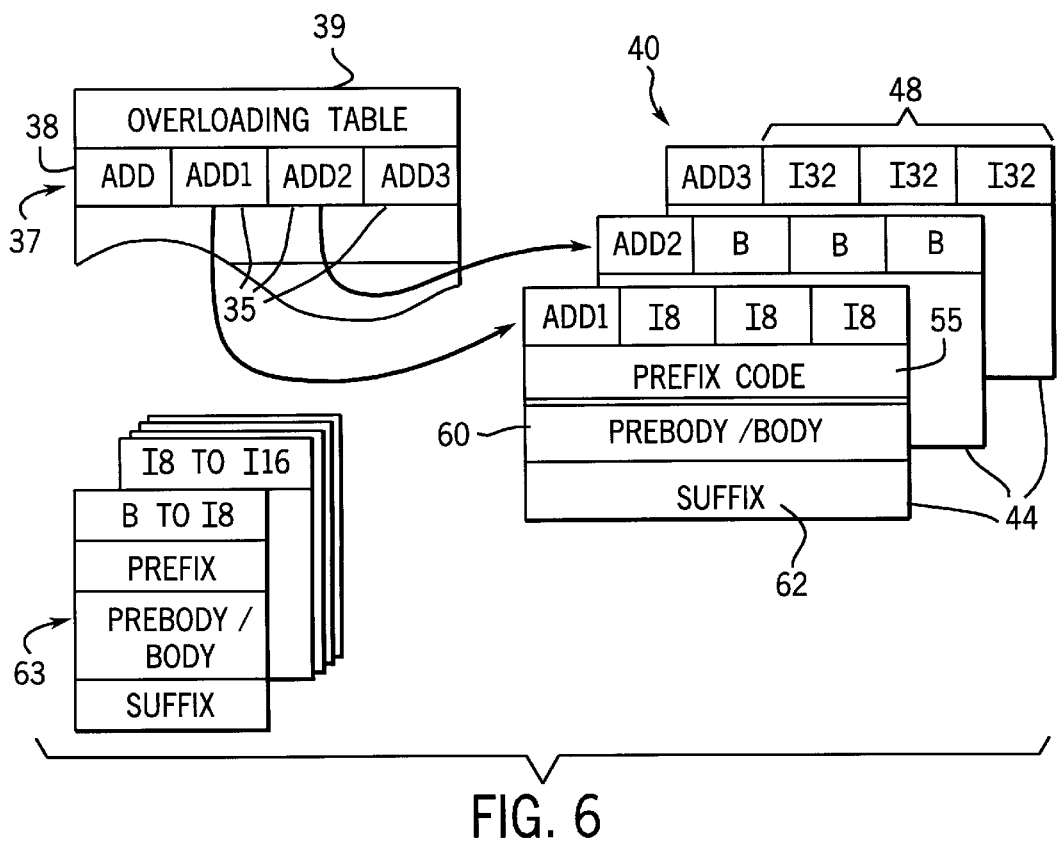
FIG. 6 is a detailed view of overloading tables and instruction tables shown in FIG. 2.

Referring to FIG. 6, the instruction table 40 includes a number of entries 44 (each depicted as a separate table in FIG. 6). A first row of each entry includes a sub-instruction name 46 followed by one or more operand-type codes 48 for as many operands as the instruction of the entry 44 requires. Following the information of this first row of the entry 44, the entry 44 also includes prefix code 55, prebody/body code 60 and suffix code 62, each of which is a precompiled object program fragment necessary for the instruction of the entry 44 to be executed on the industrial controller. These object program fragments will be described in more detail below.

In the present example, the ADD instruction name 38 is matched to a row entry 37 of the overloading table 39 having the ADD name in the first column. Typically, there will be several sub-instruction names 35 following the instruction name in the entry 37. In this case, the builder 49 reviews the entries 44 of the instruction table 40 matching the sub-instruction names 35 and finds the corresponding instruction table entries 44 having operand type codes 48 corresponding to the operand types. If there is an exact match between operand types and type codes for a given instruction table entry 44, that entry is chosen.

Thus, in the present example, if operands "B " and "A" are eight-bit integer types the scanner will identify the entry 44 for the sub instruction ADD1 having "I8" operand type codes 48 as opposed to one, for example ADD2, having Boolean operand type codes. The ADD1 sub instruction requires two operands of eight-bit integer types represented by "I8".

In the circumstance where the scanner 36 cannot find an exact match between the operand types 42 and a sub-instruction in the table 40, the present invention finds a best match between operand types 42 and operand type codes 48 in the entries 44. Referring now to FIG. 3, this best match process is performed by using a weighting table 52 which establishes a predetermined set of preferences in the selection among entries 44 of the instruction table 40 determined by data loss and future processing time involved a conversion from one operand type to another.

Specifically, the weighting table 52 as depicted, is comprised of an equal number of columns and rows each assigned to a unique operand type. The rows represent the operand type 42 of the operands in the source program 22 and the columns represent the operand types 48 of the instruction table 40. A diagonal through the table provides weights of zeros representing the fact that a conversion of a given operand type, say Boolean to an identical operand type Boolean, involves no penalty either in time or data loss. The conversion of any data type to a data type of greater precision (the upper triangular part of the table 52) is given a nominal weight of one reflecting the fact that no data is lost but a conversion step is required and hence an entry 44 requiring no conversion would be preferred. Thus a conversion from Boolean to an eight bit integer results in no loss of data but a conversion step nonetheless. On the other hand, a conversion from a higher precision to a lower precision data type (the lower triangular part of the table 52) involves the loss of data and the amount of loss is reflected by progressively increasing weight values. Thus converting from an eight-bit integer to a Boolean value is provided an arbitrary weight of two whereas conversion from a sixteen bit integer value to a Boolean value is provided with twice this arbitrary weighting or value of four.

The scanner, in selecting an entry 44 where operand types 48 do not exactly match data types 42, uses this table to select an entry 44 so that the total of the weights from table 52 for each operand that needs conversion is minimized. Note that there will be cases where an instruction will have mixed operand types.

To the extent that the best match requires conversions of operand types to other types, the compiler 17 will provide the necessary conversion routines to be placed in the object program, as will be described. Type conversion routines are well known in the art.

Referring again to FIGS. 2 and 6, thus whereas normally a perfect match in instruction name and data type may be obtained with a given table entry 44, provision is made for less than perfect matching. This means that if a new instruction is added to the instruction table 40, that a full compliment of a given instruction type allowing for different combinations and permutations of operand types need not be generated, thus simplifying the task of adding new instructions to the compiler 17 via the instruction table 40.

Once an entry 44 from the instruction table is selected by the scanner, the builder 49 receives both the source program statement 30 and the information from the entry 44 and creates a corresponding expanded instruction 54 in an unlinked object program module 56. In particular, the statement 30 is replaced by the three object program fragments 55, 60 and 62 described briefly above and forming part of the entry 44 of the instruction table 40.

The first program fragment is the prefix 55 which generally allocates space in the stack for use by the program. The final program fragment, the suffix 62 deallocates this stack space. Other initialization and clean-up operations may be provided for in these sections as will be understood to those of ordinary skill in the art. In the present example, prefix and suffix program fragments are not shown for clarity.

Next, operand gathering instructions 58 are automatically generated from the information from the entry 44 of the instruction table 40. These operand gathering instructions 58 collect the operands necessary for the particular computer instruction represented by the entry 44 and puts them in a predefined location for later operation. The operand gathering routine 58 for the ADD instruction of the present example becomes three machine language instructions as follows:

LDIA $R_2$, A (load the address of "A" in the register $R_2$).

LDW $R_1$, B (load the contents of operand "B" into register $R_1$)

LDW $R_0$, A (load the contents of operand "A" into register $R_0$)

These instructions place the necessary operands in registers of the computer 10 that will be referenced by the subsequent instruction execution routine 60. The address of any return value is also obtained at this time.

When the operands are complex types, such as arrays, external routines may be called for operand gathering.

The third object program fragment in entry 44 is the pre-body/body program fragment 60 which provides an instruction execution routine or a branch to such a routine. In the present example, because of the simplicity of the add instruction, the prebody/body is single instruction:

ADD $R_0$, $R_1$, $R_0$.

This instruction instructs the CPU 12 to add the contents of its registers $R_1$ and $R_0$ and place the result in $R_0$.

If operand returning instructions 61 are needed, they are automatically generated and placed in the unlinked object program module 56 which in the present example provides the instructions:

STW $R_0$, [$R_2$] (store the contents of $R_0$ into the address designated by register $R_2$)

The unlinked object program module 56 normally does not use the mnemonics LDIA, LDW, ADD or STW as indicated but instead places the machine readable binary values into the unlinked object program module 56 for direct reading by the CPU 12. On the other hand tag values for the operands "A" and "B" are maintained because physical addresses in memory have not yet been established for these variables prior to the linking step as will be described further below.

At the time the scanner 36 identifies the sub instruction name 35 it is also passed to a tokenizer routine 64 which inserts a "NOP" instruction (no operation) into the unlinked object program module 56 immediately before the instruction of the prefix 55, the prebody/body 60 and the suffix 62. This NOP instruction is followed by an instruction identifier uniquely indicating the entry 44 of the instruction table 40 that will be used to compile the statement 30 (here represented by the ADD1 sub-instruction). The NOP instruction, instructing the CPU to perform no operation, serves to flag the subsequent string as a tokenized instruction identifier such as will be used in a decompilation process to be described below.

At this point the unlinked object program module 56 may be linked in a conventional manner by a linker 66 which receives the unlinked object program module 56, identifies each of the variable tag names (e.g. A and B), finds physical address locations 68 in memory 16 based on the operand types that will hold the data of these particular operands, and inserts those physical addresses into the memory image object program 24.

For example, the linker 66 may place operand "A" at memory location xx10 in memory 16 (the values xx signify arbitrary memory locations) whereas operand "B" may be placed at the memory location xx11, one memory location further along in memory 16. This linking reflects the fact that operands "A" and "B" are eight-bit integer values and hence may be stored in sequential locations in an eight bit wide memory 16.

At the same time the linker 66 creates a symbol table 70 relating each symbol name (e.g. A, B) to its physical address 68 so assigned. The symbol table 70 is then used by the linker 66 to create the memory image object program 24 which is identical to the unlinked object program module 56 except that each variable name (e.g. A and B) is replaced by its physical address from the symbol table 70. The symbol table 70 is attached to the object program 24 for use in decompiling as will be described below.

The object program 68 may then be loaded into memory of the industrial controller and executed. As with the unlinked object program module 56, the mnemonics (e.g. NOP and LDIA and their extensions $R_0$, etc.) represented in the object program 24 are in fact binary values that may be interpreted directly by the CPU as instructions.

Automatic Operand Conversion

Figure 4:
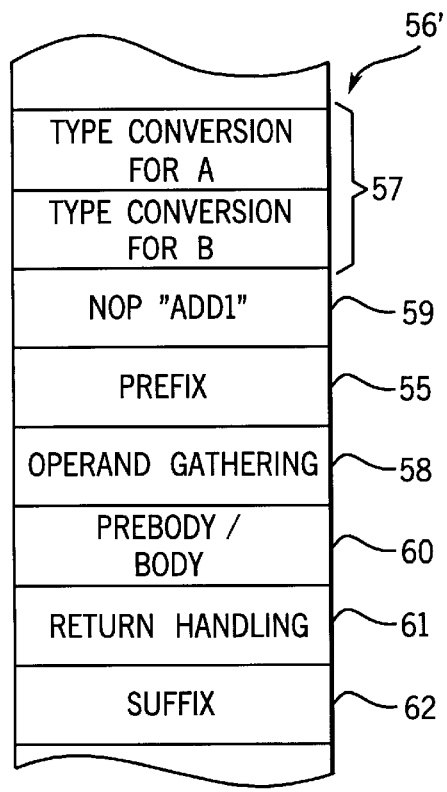
FIG. 4 is an alternative object program produced by the compiler of FIG. 2 when operand type conversion is required.

Referring now to FIGS. 3, 4 and 6, if the scanner 36 was unable to find a entry 44 exactly matching operand types 48 with operand types 42 (but nevertheless matching instruction name 38 with instruction name 46) then the builder 49 inserts conversion routines 57 prior to the NOP instruction and token 59 to convert the operands of the statement 30 to the types 48. The conversion routine is not held in the instruction table 40 but is contained in separate conversion table 63 having entries for each of the twenty possible conversions between data types. The particular conversion adopted will be determined in accordance with the entry 44 that has been identified by the scanner 36 per the weighting table 52. The conversion table operates in much the same way as the instruction table 40, providing pre-written code fragments that may be simply inserted into the unlinked object program module 56'.

As alluded to above, it is contemplated that instructions will be added to the instruction table 40 through an instruction table editor 50 which provides basic editing functions of the instruction table 40. In particular, the editor 50 will provide menus to assist the user in identifying a new instruction name 46 and operand types 48 and then will assist the user in inserting the object program fragments 55, 60 and 62. Because this is all that is required to add a new instruction to the compiler 17, the generation of the necessary data for the instruction table 40 is a relatively simple matter.

Decompiler

Figure 5:
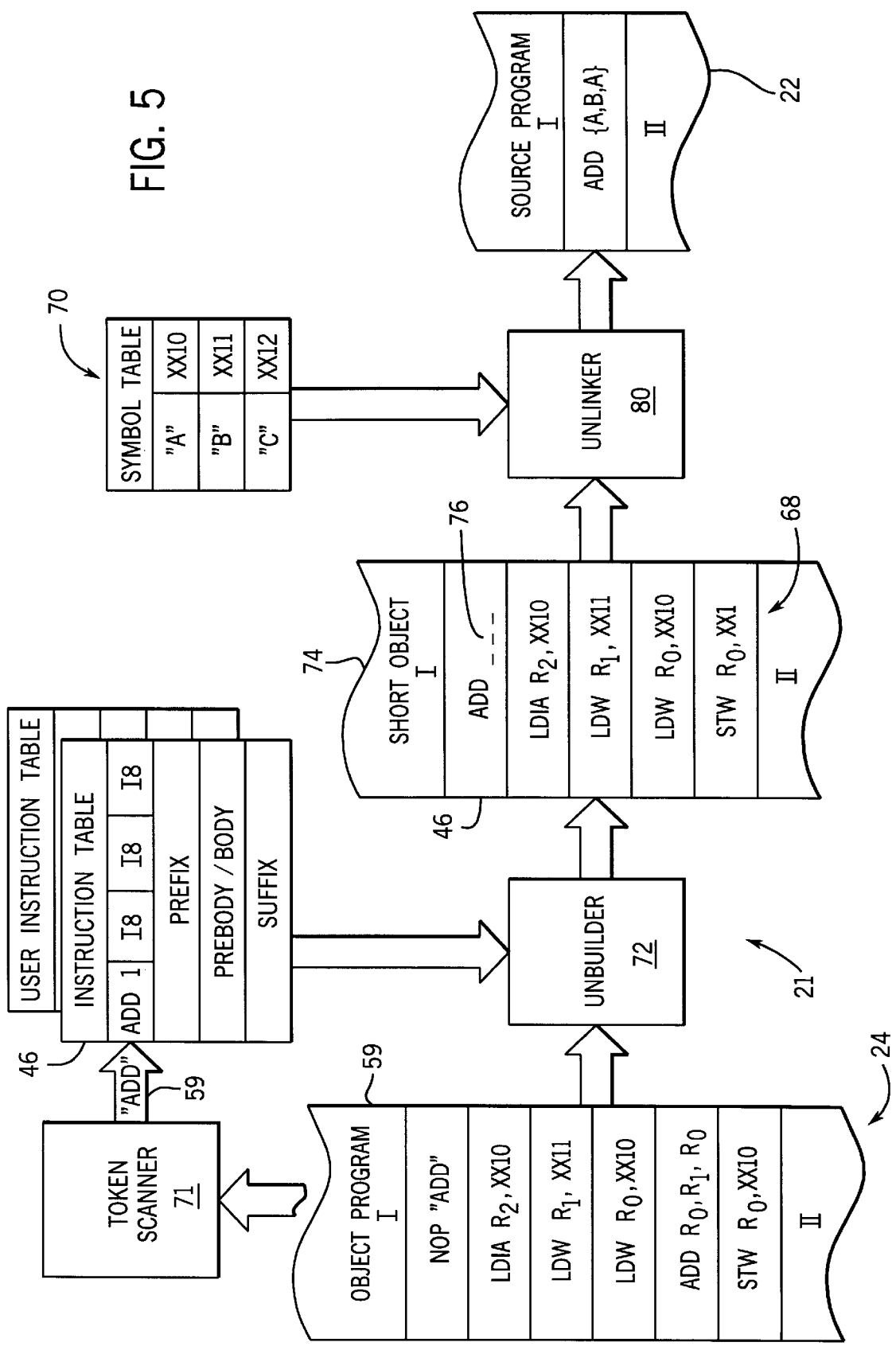

Referring now to FIG. 5, the object program 24 compiled as described above is uniquely designed to be decompiled through the use of the same instruction table 40 used to compile the source program 22. The instruction table 40, in fact, provides the ability to radically simplify the decompiling process by matching the program fragments 55, 60 and 62 contained in the instruction table 40, to portions of the object program 24 thereby removing those portions to simplify the decompiling process.

In the decompiler 21, a scanner program 71 reads and reviews the instructions of the object program 24 to find the instruction tokens 59 inserted by the tokenizer 64 as described above. In particular, the scanner 71 looks for NOP instructions followed by a unique identifier of an entry 44 of the instruction table 40. In the example of the previously compiled statement 30 (of the source program in FIG. 2), the token 59 points to the ADD1 sub-instruction entry 44. Because the token 59 provides the exact entry 44 which generated the object program following the token 59, there is no question as to matching multiple entry 44 as was previously described with respect to the scanner 36.

Once the entry 44 has been identified, it is provided to an unbuilder routine 72 which replaces the token 59 with the instruction name 46 from the instruction table 40 followed by place holders 76, one for each operand indicated at entry 44.

The unbuilder next reviews the instructions following the token 59 of the object program 24 and compares those instructions to the prebodylbody 60 in the entry 44 removing the instruction execution routine 60 from the object program 24 to create a short object 74 being identical to the object program 24 but for the removal of the prebodylbody 60. The prefix 55 and suffix 62 may be similarly removed.

The instructions remaining in the short object are the operand gathering routine 58 and operand returning routine 61 together with the particular physical addresses 68 which identify the operands as will be described. Because the operand gathering and returning routine has a well defined order, it may be received by an unlinker routine 80 which reads the physical addresses 68, looks up those addresses in the symbol table 70 previously attached to the object program 24 to provide the tag names (e.g. A, B) associated with those physical addresses.

The unlinker 80 then inserts these tag names into the short object 74 replacing the operand gathering and operand returning routine 58 and 62 in the process, to return the source program 22 in essentially the same form from which it was originally compiled. The source program 22 may be thus edited or checked for errors and recompiled at will.

It will be understood to those of ordinary skill in the art that the ambiguity normally associated in the decompiling process from the fact that a single source program instruction may generate many object program instructions, is reduced in the present invention by the instruction table which allows extraction and compression of the instruction execution routine through its linking of object program fragments to particular instructions.

The above description has been that of a preferred embodiment of the present invention. It will occur to those that practice the art that many modifications may be made without departing from the spirit and scope of the invention. In order to apprise the public of the various embodiments that may fall within the scope of the invention the following claims are made:

We claim:

1. A decompiler for an industrial controller, the decompiler operating on an object program produced on a compiler that provides user defined compilable instruction, the object program produced from a source program having instruction names and operand names, the object program further connected with a symbol table associating operand names of the source program with memory locations assigned to the operand names in the object code, the object code further having non-executing instruction providing a token identifying at least one instruction name of the source program, the decompiler stored and executed in an electronic computer and comprising:

a) an instruction table having a plurality of entries associating an instruction name with:
      i) operand interface description, providing information needed to move operand data from an arbitrary memory location to a predetermined memory location of the industrial controller, and
      ii) instruction executing code executable on the industrial controller to perform the computer operation of the instruction name on operand data at the predetermined memory location;

b) token scanner program scanning compiled object code for tokens identifying a an instruction name;

c) an unbuilder/delinker receiving the instruction name identified by the token scanner and:
      i) matching the instruction name with an entry of the instruction table to identify and replace in the object code the operand gathering code based on the operand interface description, and instruction executing code held in the instruction table, with the instruction name; and
      ii) reviewing the remaining object code for memory locations and using the symbol table to replacing these memory locations with the corresponding operand names.

2. The decompiler of claim 1 wherein the scanner detects object code tokens by looking for a NOP instruction indicating no operation.

3. A method of decompiling a program for an industrial controller having user-defined compilable instructions, the method starting with an object program and creating a source program, the object program having non-executing instructions providing a token, the token identifying at least one source program instruction name, the object program further having operand gathering code and instruction executing code, the object code being connected with a symbol table associating memory locations of the object code with operand names of the source program, the object code having been compiled using an instruction table having a plurality of entries associating user defined instruction names with:

i) operand interface description, providing information needed to move operand data from an arbitrary memory location to a predetermined memory location of the industrial controller, and ii) instruction executing code executable on the industrial controller to perform the computer operation of the instruction name on operand data at the predetermined memory location;

the method executed in an electronic computer and comprising the steps of:

a) scanning the object code for tokens identifying an instruction name;

b) matching the instruction name with an entry of the instruction table to identify and replace in the object code operand gathering code developed from the operand interface description and the instruction executing code with the instruction name; and c) reviewing the remaining object code for memory locations and using the symbol table to replace these memory locations with the corresponding operand names to return the source code.

\* \* \* \* \*